Jan. 3, 1933.    W. T. RIMELE    1,893,445
TURBINE WATER METER
Filed March 30, 1931    2 Sheets-Sheet 1
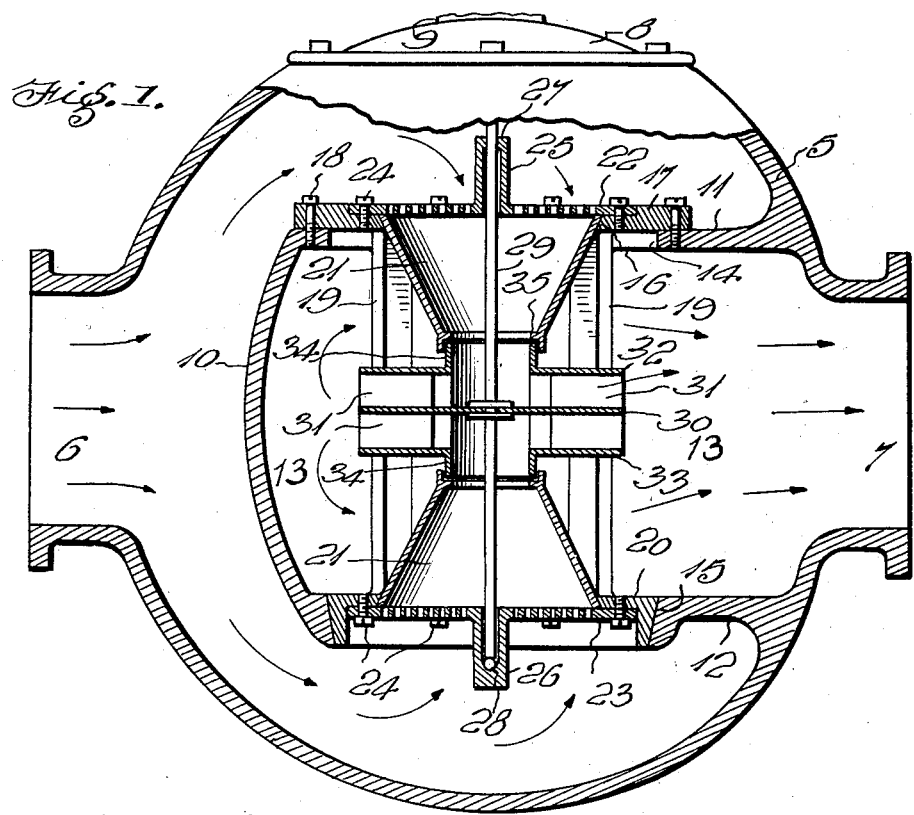
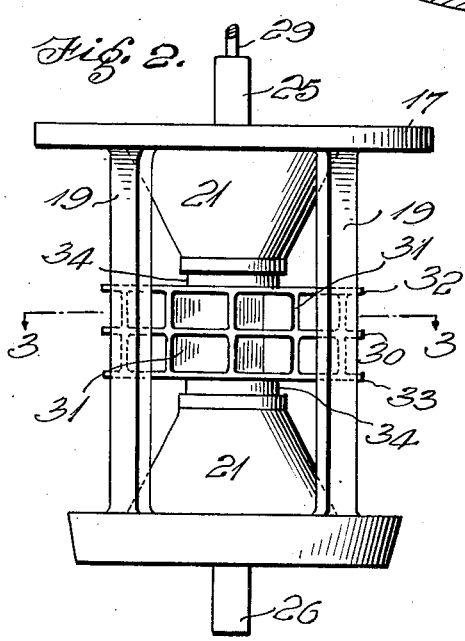
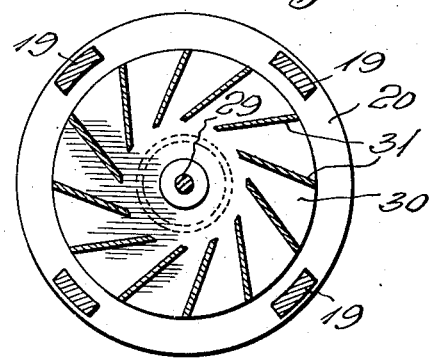
Inventor
W. T. Rimele Jan. 3, 1933. W. T. RIMELE 1,893,445
TURBINE WATER METER
Filed March 30, 1931 2 Sheets-Sheet 2

Patented Jan. 3, 1933

1,893,445

UNITED STATES PATENT OFFICE

WILLIAM T. RIMELE, OF WEST PALM BEACH, FLORIDA

TURBINE WATER METER

Application filed March 30, 1931. Serial No. 526,493.

This application deals with improvements in turbine water meters and is intended to make such devices less likely to be affected by foreign materials that may be carried in the stream and also minimizes to a great extent any loss due to friction between the moving parts.

In devices of this kind it is desirable that the quantity of water be accurately measured. For this reason it is necessary to design the meters so that there shall be no appreciable amount of leakage but that all of the water shall pass through the measuring channels.

At the same time the above purpose must be carried out without increasing the bearing surfaces to such an extent as to impose added friction.

It is also an object of my invention to provide a simplified turbine arrangement satisfactorily applied to the meter casings now customarily in service.

I have also devised my improved type of meter in order to avoid any impedance of the discharge water and thus have produced a most efficient turbine or reaction effect.

Other objects of my invention will be apparent from the following description of the preferred form of my invention as illustrated in the accompanying drawings in which:

Fig. 1 is a longitudinal vertical section of a meter embodying my improvements;

Fig. 2 is a side elevation of the turbine and its frame mounting;

Fig. 3 is a horizontal cross section on the line 3—3 of Fig. 2 and

Figure 4:
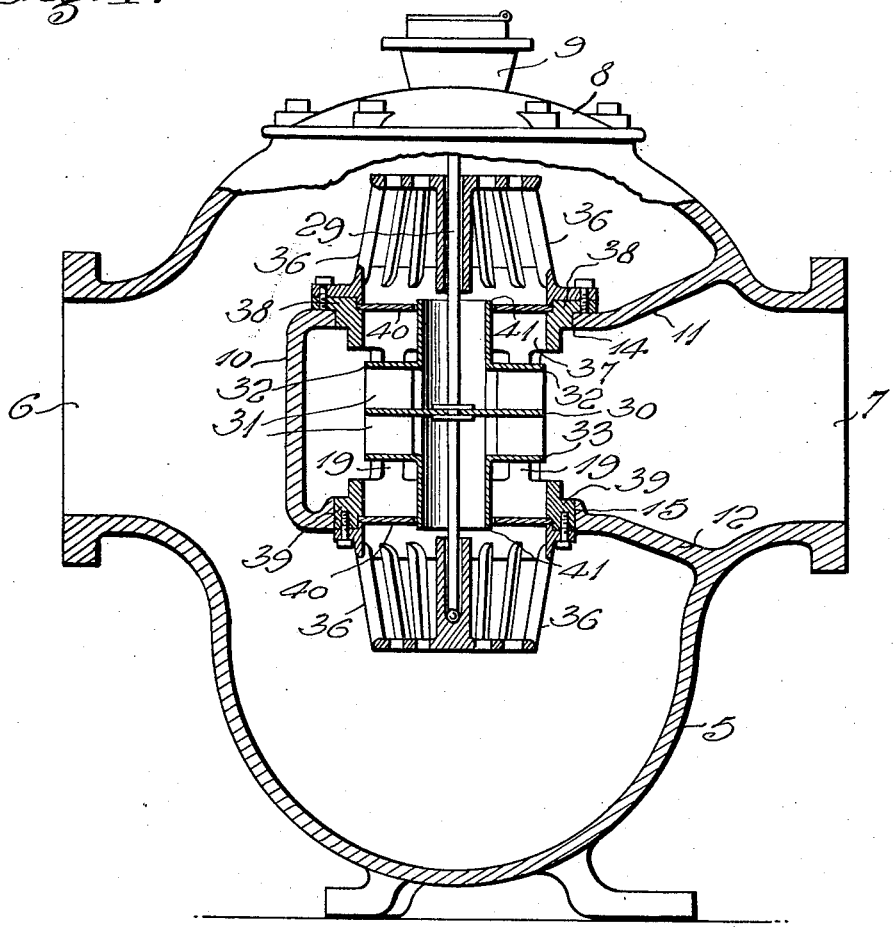
Fig. 4 is a longitudinal vertical section of a modified form of the meter.

For purposes of example I have shown in the accompanying drawings a meter casing 5 generally spherical and having an inlet 6 and an outlet 7 on opposite sides. The top of the casing has a cover-plate 8 which forms the basis of the registering device 9.

Opposite the entrance 6 an inner wall 10 is provided which extends between a horizontal wall 11 and a lower horizontal wall 12. These walls in turn form with the vertical wall 10 an outlet chamber denoted generally by the numeral 13 and leading to the outlet proper 7.

The upper wall 11 has a circular opening 14 while the lower wall 12 has a corresponding circular opening 15. The opening 15 has a conical surface as shown in the drawings. The openings 14 and 15 are arranged to receive and support the turbine frame 16.

The turbine frame 16 comprises a cover-plate 17 which extends beyond the opening 14 and is fastened by means of bolts 18 to the top of the wall 11. The cover-plate 17 is connected by means of pillars 19 to an opposite bottom plate 20 which has a depending flange conical on its outside surface to form a water-tight fit with the corresponding face 15 of the lower wall 12.

The cover-plate 17 and the bottom plate 20 are both open at the center to form bearings for deflectors which serve to direct the incoming stream of water to the turbine elements. In the form shown in Fig. 1 these deflectors are shown in the form of cones 21, 21 which are seated in the plates 17 and 20.

The larger end of each cone is clamped into the cover-plate 17 and bottom plate 20 by means of screens 22 and 23 respectively which are bolted to the cover and bottom plates by means of bolts 24, 24. At the center of each screen 22, 23, there is an outwardly extending hollow boss 25, 26. The boss 25 extending upwardly from the upper screen 22 forms a journal-bearing 27 for the shaft of the turbine.

The boss 26 depending from lower screen 23 has a thrust bearing ball 28 upon which the turbine shaft rests.

The turbine has a central rotating shaft 29 resting upon the bearing 28 and projecting upwardly into engagement with the registering device 9. Centrally of the discharge chamber 13 the shaft 29 carries a division plate 30. Upon each side of the division plate 30 are deflectors 31, 31 arranged at an inclination to the radius and forming the reaction plates of the turbine. The blades 31 extend upwardly from division plate 30 and in contact with the ring 32. The lower series of blades 31, are attached to a lower ring 33.

The rings 32 and 33 extend from the outer ends of the blades 31, 31 inwardly to a point within the nearer ends of the cones 21, 21. At this point the rings 32 and 33 have collars 34, 34 extending away from the division plate and parallel to the shaft 29. These collars terminate within the smaller ends of the cones 21, 21 and slightly spaced from the collars. Each cone 21 carries an inwardly extending rib 35.

In the modification shown in Fig. 4 instead of the screens 22, 23 the meter is shown to carry the customary conical screen cages 36, 36. In this form the frame 37 has upper flange 38 and lower flange 39 which are received in water-tight connection in the openings of the upper wall 11 and lower wall 12 respectively.

The deflectors take the form of discs 40, 40 which are open at the center to receive extended collars 41 mounted on the rings 33, 32.

As will be evident from the above description my improved turbine can be assembled for installation as a unit being fitted within the customary openings 14, 15 of the meter casing in service. The flow of the water inwardly from the opening 6 is unimpeded by the screens 22, 23 or screen cages 36, 36. The current flow through the screens or cages is directed toward the center of the turbine and passes through the collars of the turbine proper. At this point the deflectors are brought in close fit around the collars without, however, adding to the friction of the device. The flow of water through the collars meets the division plate 30 and is then directed radially against the reaction blades 31, 31. There is a consequent rotation of the turbine and its shaft 29. In this operation the discharge between the blades beyond the peripheral of the division plate 30 is relatively unimpeded and free from any back pressure. The result is that the meter is accurate in its response to current flow.

This meter is economical of manufacture and easy of installation while its operation provides accuracy and freedom from maintenance attention.

While I have shown the preferred form of my invention there are many changes in structural details and arrangements within the scope of the following claims.

What I claim is:

1. A turbine unit for a water meter, comprising an elongated frame having open ends, a screen mounted on each end and having a central bearing, a deflector mounted on each end of the frame and extending axially thereof and inwardly of the screens, a shaft journaled in said bearings of the screens, a turbine wheel mounted on said shaft between said deflectors and having a central division plate, said turbine wheel having inlet passageways registering with the inner open ends of the deflectors.

2. A turbine unit for a water meter comprising an elongated frame having open ends, a screen mounted on each end and having a central bearing, a deflector mounted on each end of the frame and converging axially thereof and inwardly of the screens, a shaft journaled in said bearings of the screens, a turbine wheel mounted on said shaft between said deflectors and having a central division plate, said turbine wheel having central inlet passageways fitting in the converging ends of the deflectors.

3. A turbine unit for a water meter, comprising an elongated frame having open ends, a screen mounted on each end and having a central bearing, a deflector mounted on each end of the frame and extending axially thereof inwardly of the screens, a shaft journaled in said bearings of the screens, a turbine wheel mounted on said shaft between said deflectors and having a central division plate, said turbine wheel having tubular inlet passageways extending axially of the shaft and into registry with the ends of the deflectors.

4. A turbine unit for a water meter, comprising an elongated frame having open ends and sides open to afford free lateral discharge therethrough, a screen mounted on each end and having a central bearing, a deflector mounted on each end of the frame and extending axially thereof inwardly of the screens, a shaft journaled in said bearings of the screens, a turbine wheel mounted on said shaft between said deflectors and having a central division plate, said turbine wheel having inlet passageways receiving liquid from the deflectors centrally of the wheel on opposite sides of the division plate and an open periphery of the turbine wheel discharging the liquid laterally of the frame and freely through the sides thereof.

5. A turbine unit for a water meter, comprising an elongated frame having open ends, a screen mounted on each end and having a central bearing, a deflector mounted on each end of the frame and extending axially thereof inwardly of the screens, a shaft journaled in said bearings of the screens, a turbine wheel mounted on said shaft between said deflectors and having a central division plate and inlet passageways registering with the inner open ends of the deflectors, said turbine wheel having a series of discharge passageways on each side of the division plate inclined relatively to the radii of said wheel, and connected with said inlet passageways.

In testimony whereof I have affixed my signature.

WILLIAM T. RIMELE.